United States Patent [19]

Lee

[11] Patent Number: 5,438,560

[45] Date of Patent: Aug. 1, 1995

[54] APPARATUS AND METHOD FOR RECORDING/REPRODUCING OPTICAL INFORMATION AND OPTICAL DISK-SHAPED RECORDING MEDIUM

[75] Inventor: Si H. Lee, Kyoungki-do, Rep. of Korea

[73] Assignee: Hyundai Electronics Industries Co., Ltd., Rep. of Korea

[21] Appl. No.: 139,033

[22] Filed: Oct. 21, 1993

[30] Foreign Application Priority Data

Dec. 31, 1992 [KR] Rep. of Korea .................... 27199

[51] Int. Cl.$^6$ .................................................. G11B 7/00
[52] U.S. Cl. ........................................ 369/58; 369/54; 369/47; 369/48
[58] Field of Search ............... 369/58, 47, 48, 49, 369/59, 54, 53, 424, 32

[56] References Cited

U.S. PATENT DOCUMENTS

| | | |
|---|---|---|
| 4,223,347 | 9/1980 | Bouwhuis et al. |
| 4,925,717 | 5/1990 | Tsukamura et al. |
| 5,111,444 | 5/1992 | Fukushima et al. ............ 369/58 |
| 5,235,585 | 8/1993 | Bish et al. ...................... 369/58 X |

Primary Examiner—Georgia Y. Epps
Assistant Examiner—Muhammad N. Edun
Attorney, Agent, or Firm—Wigman, Cohen, Leitner & Myers

[57] ABSTRACT

An optical disk-shaped recording medium comprising a plurality of tracks, the tracks constituting blocks in the unit of a predetermined number, each of the blocks being provided with a data region and a first mapping region, a second mapping region being further provided on a center one of the entire tracks, each of the first mapping regions including mapping sectors and replacement sectors, the second mapping region including; a mapping information recording region and a replacement sector region for the first mapping regions of the whole of the blocks, the mapping sectors of each of the first mapping regions recording mapping information about bad sectors of the corresponding block thereon, the replacement sectors of each of the first mapping regions being replaced for the bad sectors of the corresponding block, and an apparatus and a method for recording/reproducing optical information using the optical disk-shaped recording medium.

3 Claims, 6 Drawing Sheets

FIG. 4
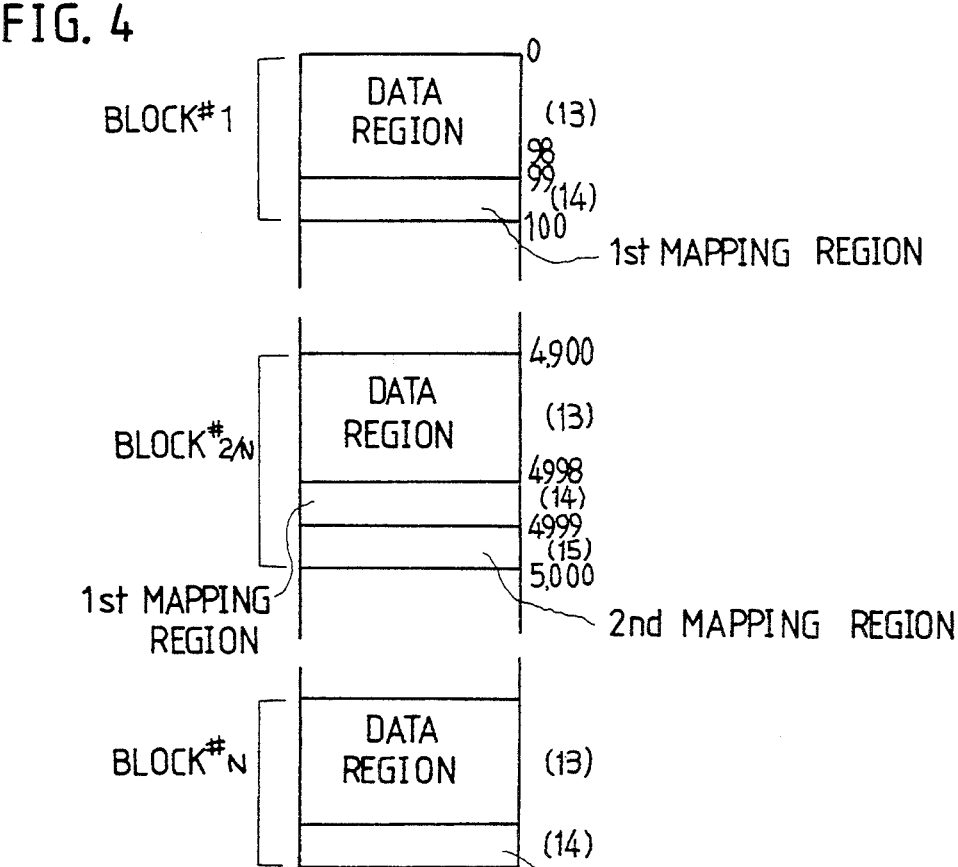
FIG. 5
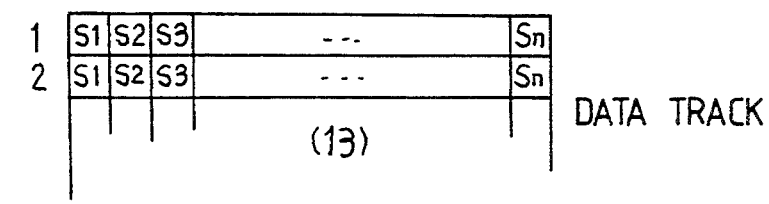
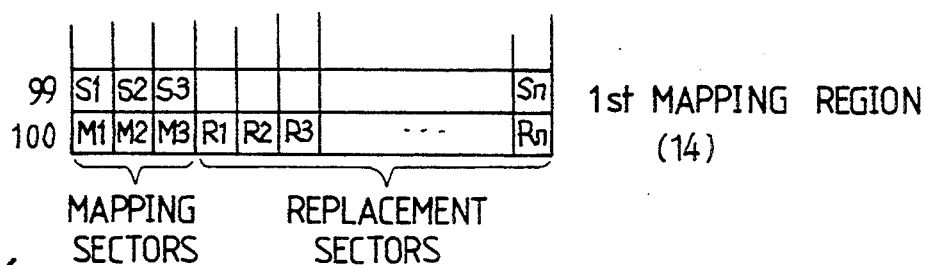
FIG. 6
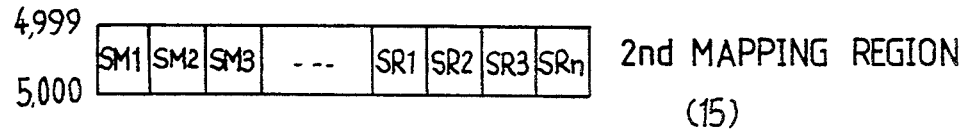

APPARATUS AND METHOD FOR RECORDING/REPRODUCING OPTICAL INFORMATION AND OPTICAL DISK-SHAPED RECORDING MEDIUM

BACKGROUND OF THE INVENTION

1. Field of the Invention

The present invention relates in general to the recording/reproduction of optical information, and more particularly to an optical disk-shaped recording medium in which tracks constitute blocks in the unit of a predetermined number, each of the blocks being provided with a data region and a first mapping region, a second mapping region being further provided on one of the blocks having a center one of the tracks, each of the first mapping regions including mapping sectors and replacement sectors, the second mapping region including a mapping information recording region and a replacement sector region for the first mapping regions of the whole of the blocks, and an apparatus and a method for recording/reproducing optical information using the optical disk-shaped recording medium in which bad sectors of the entire tracks can efficiently be handled.

2. Description of the Prior Art

Generally, in recording media such as optical disks, the recording/reproduction of optical information is performed by applying a laser beam condensed in the order of 1 μm to the optical disks. At this time, various errors may be generated due to dust or alien substances on the surfaces of the optical disks and defects thereon. In the optical disk having a so-called track/sector construction, data is encoded and reproduced in the unit of sector for error detection and correction. Conventionally, since error detection/correction codes are in the unit of sector of 512 KByte, they cannot be applied to a disk having a considerable interleave length such as, for example, a compact disk (CD) not employing the sector construction. Also, in the case where burst errors affecting the entire sectors are generated, they cannot be corrected, resulting in abnormal reproduction of the data, differently from random errors occurring at a part of the sectors.

As one of methods for solving the above problem, there is known a replacement method for the optical disk of the recording type in which bad sectors are detected by a reading discrimination operation of reproducing the recorded data, just after the recording to discriminate whether the recorded data is accurately reproduced, and information on the detected bad sectors are recorded on replacement sectors which are formed on particular regions of the optical disk. However, the above-mentioned replacement method has a disadvantage in that the management of the replacement sectors is complex and difficult since the defects on the optical disk of the recording type are increased due to the natural life of the disk and the number of recording times, resulting in an increase in the replacement time.

Also, the optical disk of the reproduction-only type cannot employ the reading discrimination operation since it is stamped in large quantities in a manufacturing plant. As a result, all of the manufactured disks must be read again to search for bad ones among the disks. Reading all the manufactured disks results in an increase in the manufacturing cost.

In a conventional apparatus for recording/reproducing optical information using such an optical disk, in the case where data is repeatedly recorded on the same sector of the optical disk, a bad sector detection circuit detects an error in a sector address to a sector identifier and recognizes a sector of the detected error as a bad sector. In this case, data recorded on a data region cannot be detected ahead of the sector address to the sector identifier. For this reason, data may be recorded on the bad sector. This degrades the reliability.

FIG. 1 is a diagrammatic view illustrating a recording format of a conventional optical disk-shaped recording medium which is shown in U.S. Pat. No. 4,925,717. As shown in this drawing, the conventional optical disk-shaped recording medium comprises tracks, each of which includes a predetermined number of sectors SC (for example, 32 sectors). Each of the sectors SC is partitioned into a predetermined number of blocks BL1–BLn (for example, 42 blocks), each of which is provided with a control recording region (referred to hereinafter as ARC) and an information writing region (referred to hereinafter as ARD). The ARC is provided with a servo region (referred to hereinafter as ARS) and a traverse region (referred to hereinafter as ART). The ARS is provided with a pair of tracking information pits (referred to hereinafter as QA and QC) and a clock information pit (referred to hereinafter as QB). The ART is provided with a pair of traverse information pits (referred to hereinafter as QD and QE) every 16 consecutive tracks. The use of the QD and QE makes the counting of traverses more accurate and, thus, the tracking more accurate.

In other words, the QD and QE are provided on the ART at n interval from each other of a distance P. The QD is shifted at an interval of 4 consecutive tracks, whereas the QE is shifted for each track. The traverse counting is performed in the unit of track by the QD and QE. Therefore, data regarding the number and direction of track jumps can be obtained based on the QD and QE and the tracking can thus be performed more accurately on the basis of the obtained data.

However, the above-mentioned U.S Patent is desirable to make the tracking more accurate by performing the traverse counting at an interval of one track, but has the disadvantage that it cannot propose how to skip a bad sector resulting from an error of the disk and record information on the bad sector on a different region.

SUMMARY OF THE INVENTION

Therefore, the present invention has been made in view of the above problems, and it is an object of the present invention to provide an optical disk-shaped recording medium in which tracks constitute blocks in the unit of a predetermined number, each of the blocks being provided with a data region and a first mapping region, a second mapping region being further provided on a center one of the entire tracks, each of the first mapping regions including three mapping sectors provided at the head of the last track of each of the blocks and the subsequent replacement sectors provided on the same track, the second mapping region including a mapping information recording region and a replacement sector region for the first mapping regions of the whole of the blocks, and an apparatus and a method for recording/reproducing optical information using the optical. disk-shaped recording medium in which bad sectors of the entire tracks can efficiently be handled.

In accordance with one aspect of the present invention, there is provided an optical disk-shaped recording medium comprising a plurality of tracks, said tracks constituting blocks in the unit of a predetermined number, each of said blocks being provided with a data region and a first mapping region, a second mapping region being further provided on a center one of the entire tracks, each of said first mapping regions including mapping sectors and replacement sectors, said second mapping region including a mapping information recording region and a replacement sector region for said first mapping regions of the whole of said blocks, said mapping sectors of each of said first mapping regions recording mapping information about bad sectors of the corresponding block thereon, said replacement sectors of each of said first mapping regions being replaced for the bad sectors of the corresponding block.

In accordance with another aspect of the present invention, there is provided an apparatus for recording/reproducing optical information using an optical disk, comprising main processing means for controlling the entire operation of a system; system processing means for transferring a plurality of control signals from said main processing means to the associated components and controlling the associated components under the control of said main processing means; storage means for storing data from said system processing means; error detection/correction means for detecting an error of the data stored in said storing means and correcting the detected error; sector read/write control means for reading and writing a target sector address of the error detected by said error detection/correction means; disk control means for controlling the optical disk in response to the target sector address read from said sector read/write control means; mapping memory means for storing mapping sector information from said system processing means; modulating/demodulating means for modulating the data from said storage means and writing demodulated data into said storage means; control logic means for outputting a control signal in response to an output of said modulating/demodulating means; drive control means for driving the optical disk in response to the control signal from said control logic means; and drive interfacing means for transferring the control signal from said control logic means to said drive control means.

In accordance with a further aspect of the present invention, there is provided a method of recording optical information using an optical disk, comprising the steps of checking whether a target sector of the optical disk on which data is to be recorded is a bad sector, upon receiving a data recording command from main processing means; storing information into storage means in accordance with the checked result; reading information from mapping sectors of a block of the optical disk to which said target sector belongs and storing the read information into mapping memory means; receiving the data to be recorded from said main processing means and checking an error of the received data; checking whether said target sector is the bad sector; allotting a replacement sector of the optical disk to said target sector if it is checked that said target sector is the bad sector and updating the mapping sector information in said mapping memory means; seeking said target sector if it is checked that said target sector is normal and setting the recording command in sector read/write control means so that the data can be recorded on said target sector; and modulating the data and recording the modulated data on said target sector.

In accordance with yet another aspect of the present invention, there is provided a method of reproducing optical information using an optical disk, comprising the steps of checking whether a target sector of the optical disk from which data is to be reproduced is a bad sector, upon receiving a data reproduction command from main processing means; storing information into storage means in accordance with the checked result; reading information from mapping sectors of a block of the optical disk to which said target sector belongs and storing the read information into mapping memory means; checking whether said target sector is the bad sector; reading a replacement sector of the corresponding block if it is checked that said target sector is the bad sector; seeking said target sector if it is checked that said target sector is normal and setting the reproduction command in sector read/write control means so that the data can be reproduced from said target sector; moving an optical head to said target sector; demodulating the ;data read by said optical head; correcting an error of the demodulated data and storing the error-corrected data into said storage means; and sending the error-corrected data stored in said storage means to said main processing means through system processing means.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagrammatic view illustrating data and mapping regions of an optical disk in accordance with the present invention;

FIG. 5 is a diagrammatic view illustrating a format of each block in FIG. 4;

FIG. 6 is a diagrammatic view illustrating a format of a second mapping region in FIG. 4;

DETAILED DESCRIPTION OF THE PREFERRED EMBODIMENTS

Figure 3:
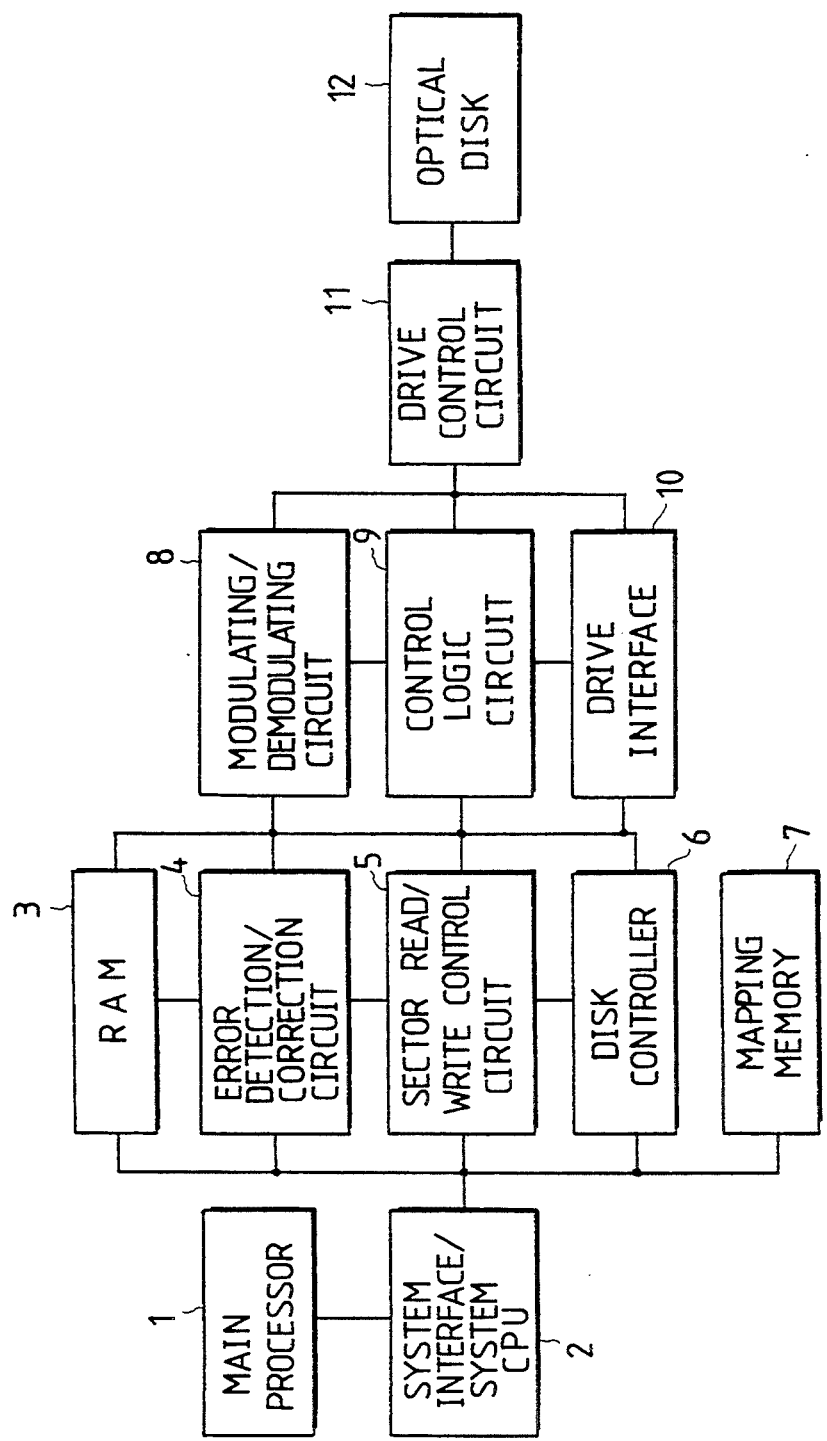
FIG. 3 is a block diagram of an apparatus for recording/reproducing optical information in accordance with the present invention.

Referring to FIG. 3, there is shown a block diagram of an apparatus for recording/reproducing optical information in accordance with the present invention. As shown in this drawing, the recording/reproducing apparatus of the present invention comprises a host central processing unit (CPU) 1 as a main processor for controlling the entire operation of the system, a system interface/system CPU 2 for transferring a plurality of control signals from the main processor 1 to the associated components and controlling the associated components under the control of the main processor 1, and a RAM 3 for storing data from the system interface/system CPU 2.

An error detection/correction circuit 4 is provided in the recording/reproducing apparatus to detect an error of the data stored in the RAM 3 and correct the detected error.

A sector read/write control circuit 5 is also provided the recording/reproducing apparatus to read and write a target sector address of the error detected by the error detection/correction circuit 4.

A disk controller 6 is also provided in the recording/reproducing apparatus to control an optical disk 12 in response to the target sector address read from the sector read/write control circuit 5.

The recording/reproducing apparatus also comprises a mapping memory 7 for storing mapping sector information from the system interface/system CPU 2, a modulating/demodulating circuit 8 for modulating the data from the RAM 3 and writing demodulated data into the RAM 3, a control logic circuit 9 for outputting a control signal in response to an output of the modulating/demodulating circuit 8, a drive control circuit 11 for driving the optical disk 12 in response to the control signal from the control logic circuit 9, and a drive interface 10 for transferring the control signal from the control logic circuit 9 to the drive control circuit 11.

The operation of the recording/reproducing apparatus with the above-mentioned construction in accordance with the present invention will hereinafter be described in detail.

Figure 1:
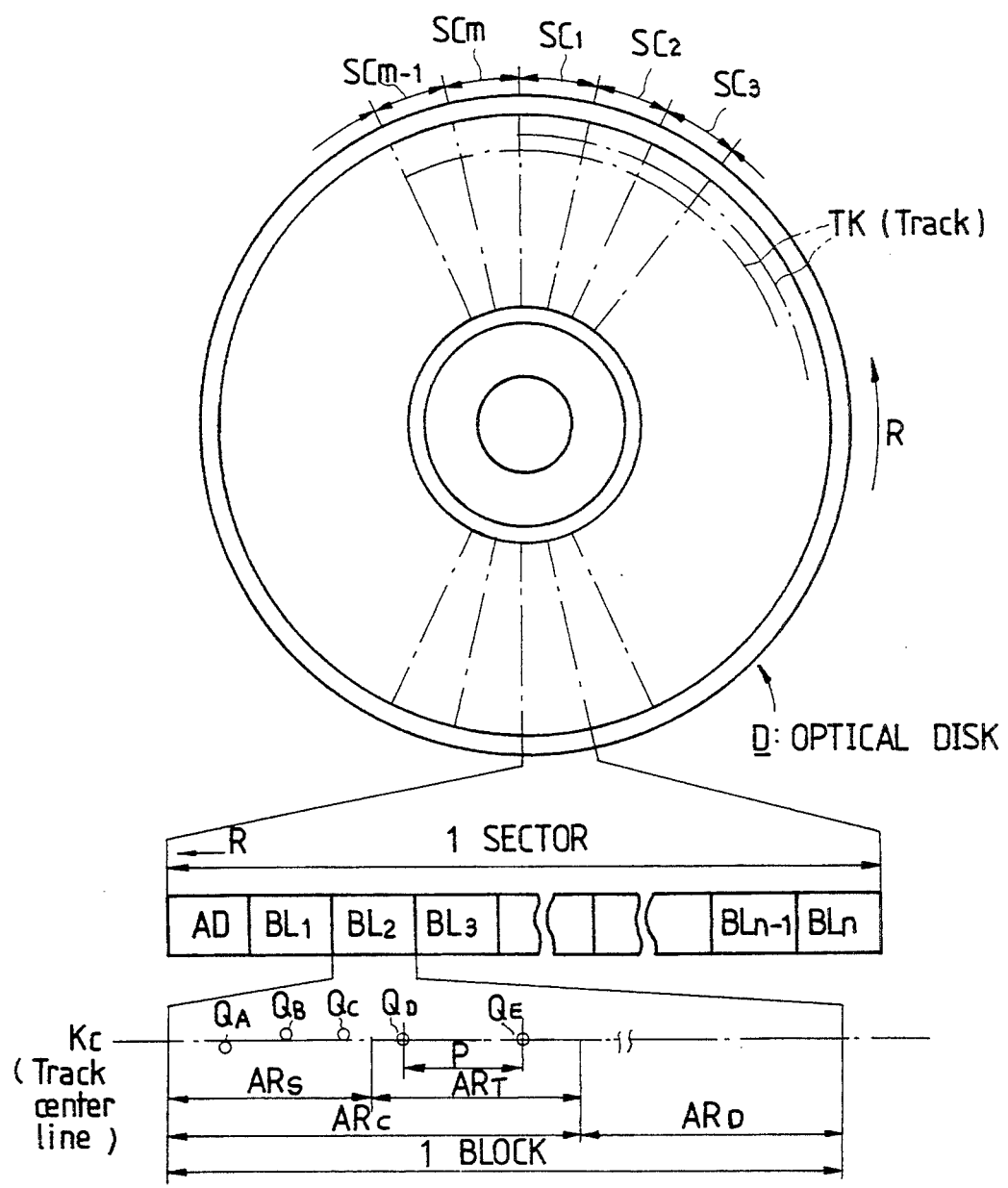
FIG. 1 is a diagrammatic view illustrating a recording format of a conventional optical disk-shaped recording medium.
Figure 2:
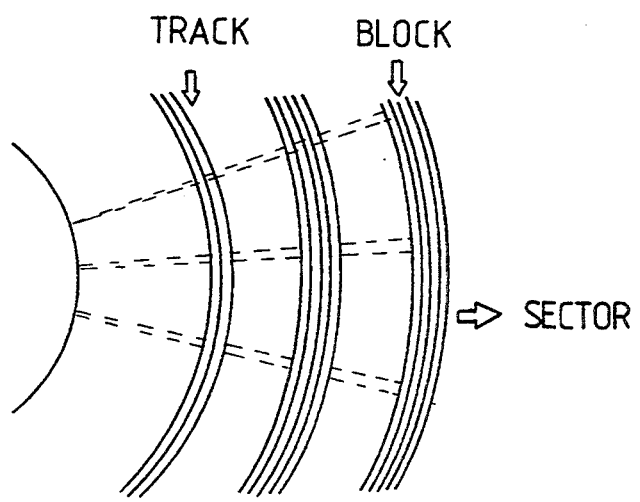
FIG. 2 is a diagrammatic view illustrating a construction of a general optical disk.

First, for the purpose of efficiently managing and handling bad sectors in recording or reproducing data on/from the optical disk, tracks of the optical disk as shown in FIG. 2 constitutes blocks in the unit of a predetermined number (for example, 100 tracks/1 block) as shown in FIG. 4. In FIG. 5, the tracks are numbered beginning with 1, whereas 0 in FIG. 4.

In FIG. 4, each block (100 tracks) is provided with a user data track region 13 including 99 tracks (No. 0–98) and a first mapping region 14 including the remaining one track (No. 99). A second mapping region 15 is further provided on a center one of the entire tracks. Namely, if the total number of the tracks is, for example, 10,000, the second mapping region 15 is provided on the track numbered with 5,000. The second mapping region 15 includes a mapping information recording region and a replacement sector region for the 100 first mapping regions 14 of the whole of the blocks. In this connection, the second mapping region 15 is used for the management and replacement of the bad sectors of the entire tracks.

As shown in FIG. 5, each of the first mapping regions 14 includes three mapping sectors M1–M3 provided at the head of the last track of each of the blocks and the subsequent replacement sectors R1–Rn provided on the same track. In FIG. 6, the replacement sector region of the second mapping region 15 is used when the replacement sectors R1–Rn of each of the first mapping regions 14 are insufficient or when a defect is present on the mapping information recording region of the second mapping region 15. It should be noted that, the number of tracks per block may be such a value that an optical head can scan at a high speed or a value within the optimal operable range of the optical head.

The blocks #1–#N are formatted on the optical disk in the above manner before data is accessed by a drive system. Test data is recorded on the formatted blocks #1–#N. The test data is then reproduced from the blocks #1–#N. In this manner, it is discriminated whether an error is present in the sector address or a defect is present in the data region. If it is discriminated that the error is present in the sector address, the same mapping information on the corresponding bad sector is recorded on the mapping sectors M1–M3 of the first mapping region 14 of the corresponding block as shown in FIG. 5. Also, the replacement sectors R1–Rn of the first mapping region 14 are used when the mapping sectors M1–M3 of the same first mapping region 14 are bad sectors.

For example, provided that the mapping sector M1 of the first mapping region 14 is bad, the information on the mapping sector M2 thereof is read by the drive system. Similarly, if the mapping sector M2 of the first mapping region 14 is bad, the information on the mapping sector M3 thereof is read by the drive system. Also, as shown in FIG. 6, the second mapping region 15 is provided on the center one (No. 4999) of the entire tracks and includes the mapping information recording region and the replacement sector region for the 100 first mapping regions 14 of the whole of the blocks. All information regarding the first and second mapping regions 14 and 15 are stored in the mapping memory 7. Therefore, actual data is recorded on the optical disk 12 after confirmation of presence of a defect on the corresponding recording region depending on the information in the mapping memory 7. On the other hand, provided that the mapping sector SM1 of the second mapping region 15 is bad, the information on the mapping sector SM2 thereof is read by the drive system. Similarly, if the mapping sector SM2 of the second mapping region 15 is bad, the information on the mapping sector SM3 thereof is read by the drive system.

As mentioned above, the blocks #1–#N are formatted on the optical disk 12 at an interval of 100 tracks. Under this condition, the optical information recording/reproducing apparatus discriminates the presence of the errors in the sector address and data and the defect on the recording region by recording and reproducing the test data on/from the sectors of the blocks. In accordance with the discriminated result, the recording/reproducing apparatus records the information on the bad sectors on the mapping sectors M1–M3 of the first mapping region 14.

The sector address error signifies a self-error in the sector on which the data is to be recorded. The sector error address is read or written as the target sector address by the sector read/write control circuit 5. The control logic circuit 9 detects the sector error address in response to the output signal from the sector read/write control circuit 5.

The data error in the data region is detected as an error detection/correction code by the error detection/correction circuit 4. Recorded on the mapping sectors are addresses of the bad sectors and addresses of the replacement sectors for the bad sectors. Also, states of the replacement sectors are recorded on the mapping sectors.

Figure 7:
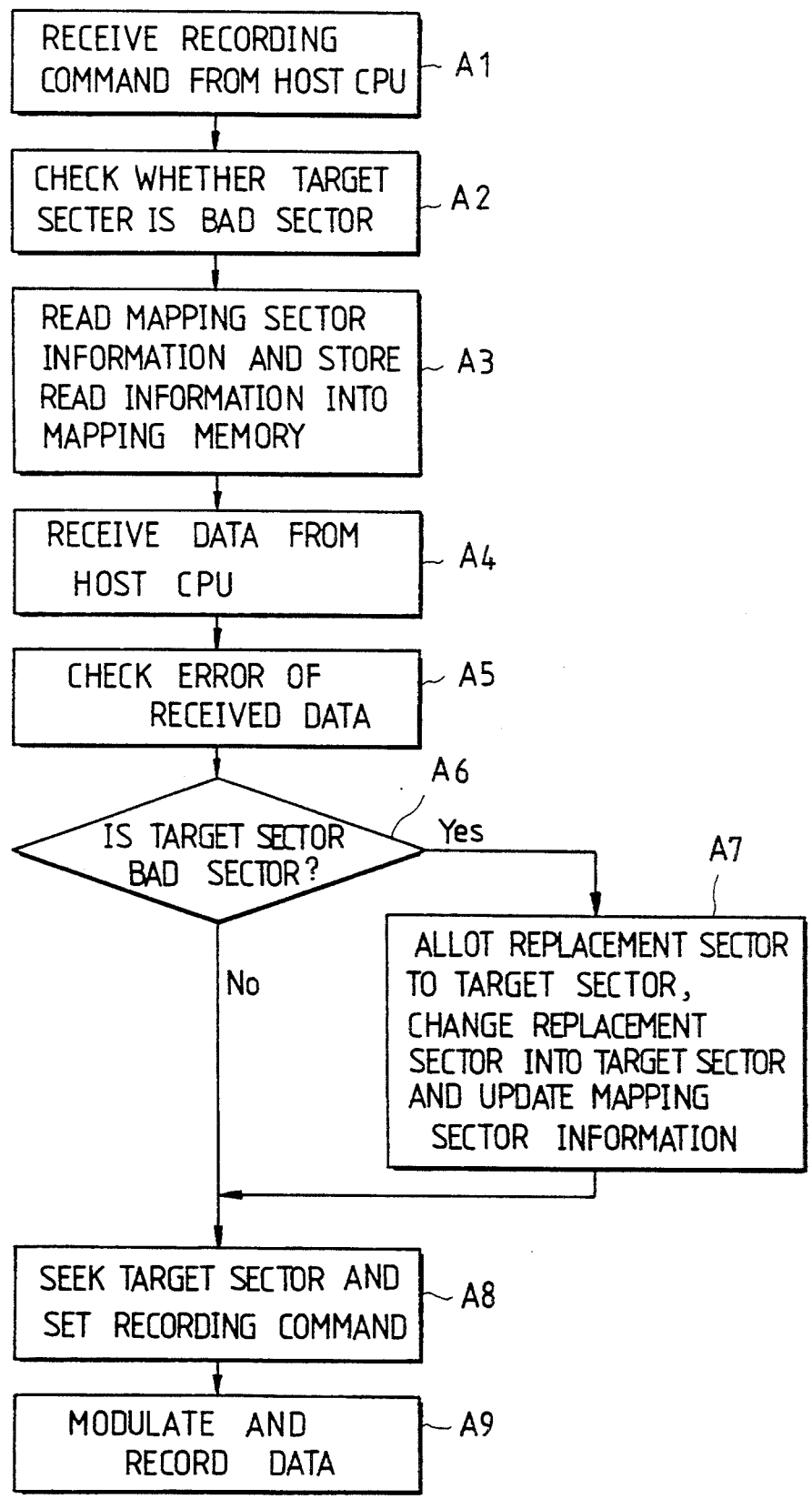
FIG. 7 is a flowchart illustrating a method of recording the optical information in accordance with the present invention.

Referring to FIG. 7, there is shown a flowchart illustrating a method of recording the optical information in accordance with the present invention. First, the main processor 1 generates a recording command to the system interface/system CPU 2 at the step A1. In response to the recording command from the main processor 1, the system interface/system CPU 2 outputs a device command block to the disk controller 6. Upon receiving the device command block, the disk controller 6 instructs the drive control circuit 11 to scan a track of a block to which the target sector belongs. It is checked at the step A2 whether the target track/sector (referred to hereinafter as the target sector) is a bad sector. Information is stored in the RAM 3 in accordance with the checked result.

If the target sector has been scanned, the system CPU 2 reads the information from the mapping sector M1 and stores the read information into the mapping memory 7 at the step A3. At this time, the system CPU 2 reads the information from the mapping sector M2 if the mapping sector M1 is bad and, going one step forward, reads the information from the mapping sector M3 if the mapping sector M2 is bad, and then stores the read information into the mapping memory 7.

The system CPU 2 receives data to be recorded on the optical disk from the main processor 1 and stores the received data into the RAM 3 at the step A4. The error detection/correction circuit 4 checks at the step A5 whether correct data from the main processor 1 is sent to the RAM 3. Here, the error detection/correction circuit 4 does not perform the function of detecting and correcting the error of the data, but checks using a parity bit whether correct data from the main processor 1 is sent to the RAM 3.

Then, it is checked at the step A8 whether the target sector is the bad sector. If it is checked at the step A8 that the target sector is the bad sector, a replacement sector address is detected from the mapping information in the mapping memory 7 to allot the corresponding replacement sector to the target sector at the step AT. The allotted replacement sector is changed into the target sector. The information regarding the bad sector and the replacement sector is updated and the updated information is stored in the RAM 7.

In the case where all of the replacement sectors of the corresponding block have been used, one of the sectors of the replacement sector region not used is allotted to the replacement sector. The information regarding the mapping sectors M1–M3 in the mapping memory 7 is updated on the basis of the allotted replacement sector.

If it is checked at tile step A6 that the target sector is normal or after performing the step A7, the disk controller 6 instructs the drive control circuit 11 to seek the track of the block to which the target sector belongs, at the step A8. Also, the disk controller 6 sets the recording command in the sector read/write control circuit 5 so that the data can be recorded on the target sector.

The modulating/demodulating circuit 8 modulates the data from the RAM 8 and outputs the modulated data to the drive control circuit 11 so that the data can be recorded on the target sector of the optical disk 12 at the step A9.

Figure 8:
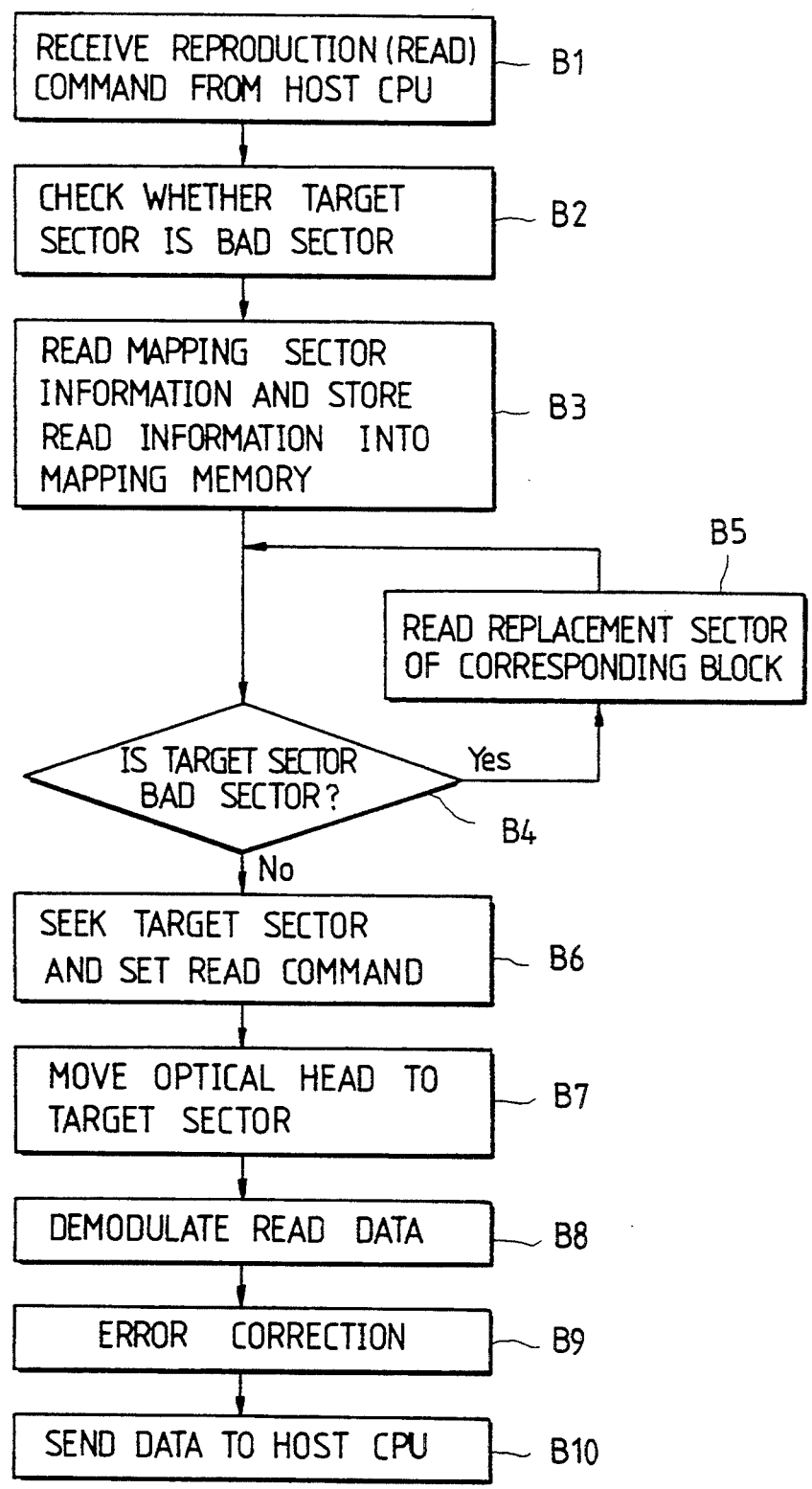
FIG. 8 is a flowchart illustrating a method of reproducing the optical information in accordance with the present invention.

Referring to FIG. 8, there is shown a flowchart illustrating a method of reproducing the optical information in accordance with the present invention. First, the main processor 1 generates a reproduction (read) command to the system interface/system CPU 2 at the step B1. In response to the reproduction command from the main processor 1, the system interface/system CPU 2 outputs a device command block to the disk controller 6. Upon receiving the device command block, the disk controller 6 instructs the drive control circuit to scan the first mapping region 14 of a block to which the target sector from which the data is to be read belongs. It is checked at the step B2 whether the target sector is a bad sector. Information is stored in the RAM 3 in accordance with the checked result.

If the target sector has been scanned, the system CPU 2 reads the information from the mapping sector M1 and stores the read information into the mapping memory 7 at the step B3. At this time, the system CPU 2 reads the information from the mapping sector M2 if the mapping sector M1 is bad and, going one step forward, reads the information from the mapping sector M3 if the mapping sector M2 is bad, and then stores the read information into the mapping memory 7. Also, if the first mapping region 14 is bad or the replacement sector to be used is not present in the first mapping region 14, the system CPU 2 scans the second mapping region 15.

It is checked at the step B4 whether the target sector is the bad sector. If it is checked at the step B4 that the target sector is the bad sector, a replacement sector address is detected from the mapping information in the mapping memory 7 to read a replacement sector of the corresponding block at the step B8.

If it is checked at the step B4 that the target sector is normal, the disk controller 6 instructs the drive control circuit 11 to seek the track of the block to which the target sector belongs, at the step B6. Also, the disk controller 6 sets the read command in the sector read/write control circuit 5 so that the data can be read from the target sector. An optical head (not shown) is moved to the target sector at the step B7.

After performing the step B7, the data read by the optical head is applied to the modulating/demodulating circuit 8 through the drive control circuit 11 and the control logic circuit 9. The modulating/demodulating circuit 8 demodulates the data from the optical head and outputs the demodulated data to the RAM 3 at the step B8.

The error detection/correction circuit 4 detects the error of the data stored in the RAM 3 and corrects the detected error at the step B9. The error to be corrected is a random error or a burst error which may take place on the disk or due to any other causes when the data is read from the disk.

The error-corrected data from the error detection/correction circuit 4 is again stored in the RAM 3. The error-corrected data from the RAM 3 is sent to the main processor 1 through the system interface/system CPU 2 at the step B10. In this manner, the reproduction of the data recorded on the optical disk 12 is performed.

As apparent from the above description, according to the present invention, the bad sectors can efficiently be handled although they are generated in large quantities or in use of the optical disk. Therefore, the data, can reliably be recorded or reproduced and the manufacturing cost can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of recording optical information using an optical disk, comprising the steps of:
   checking whether a target sector of the optical disk on which data is to be recorded is a bad sector, upon receiving a data recording command from main processing means;
   storing information into storage means in accordance with the checked result;
   reading information from mapping sectors of a block of the optical disk to which said target sector belongs and storing the read information into mapping memory means;

receiving the data to be recorded from said main processing means and checking for an error in the received data;

checking whether said target sector is the bad sector;

allotting a replacement sector located in a center of the optical disk to the target sector if it is detected that said target sector is the bad sector, and updating the mapping sector information in said mapping memory means;

seeking said target sector if it is checked that said target sector is normal and setting the recording command in sector read/write control means so that the data can be recorded on said target sector; and modulating the data and recording the modulated data on said target sector.

2. A method of reproducing optical information using an optical disk, comprising the steps of:

checking whether a target sector of the optical disk from which data is to be reproduced is a bad sector, upon receiving a data reproduction command from a main processing means;

storing information into storage means in accordance with the checked result;

reading information from mapping sectors of a block of the optical disk to which said target sector belongs and storing the read information into mapping memory means;

checking whether said target sector is the bad sector;

reading a replacement sector in a center block of the optical disk if it is detected that the target sector is the bad sector, and updating the mapping sector information in said mapping memory means:

seeking said target sector if it is checked that said target sector is normal and setting the reproduction command in a sector read/write control means so that the data can be reproduced from said target sector;

moving an optical head to said target sector;

demodulating the data read by said optical head;

correcting an error of the demodulated data and storing the error-corrected data into said storage means; and sending the error-corrected data stored in said storage means to said main processing means through system processing means.

3. A method of recording optical information using an optical disk, comprising the steps of:

providing an optical disk-shaped recording medium having on a surface thereof a plurality of tracks, wherein a predetermined number of said tracks constitute blocks, each of the blocks including:
a data region,
a first mapping region, each of which includes:
mapping sectors, each of which includes an area for recording mapping information about bad sectors of the corresponding block thereon, and
replacement sectors, wherein the replacement sectors of each of the first mapping regions are replaced for bad sectors of the corresponding block, a second mapping region located at a center one of all the tracks, which includes:
a mapping information recording region and
a replacement sector region for the first mapping regions of the entirety of the blocks, receiving a data recording command from main processing means and determining whether a target sector on which data is to be recorded is a bad sector, responsive to the data recording command;

storing information into storage means in accordance with the bad sector determination;

reading information from the mapping sectors to which the target sector belongs and storing the read information into mapping memory means;

receiving from said main processing means data to be recorded and checking for an error in the received data;

determining whether the target sector is a bad sector;

allotting a replacement sector located in a center of the optical disk to the target sector if it is determined that it is a bad sector and updating the mapping sector information in the mapping memory means;

seeking the target sector if it is determined that it is not a bad sector and setting the recording command in a sector read/write control means so that the received data can be recorded on the target sector; and modulating the received data and recording the modulated data on the target sector.

* * * * *